United States Patent
Kim et al.

(10) Patent No.: US 11,722,088 B2
(45) Date of Patent: Aug. 8, 2023

(54) MOTOR DRIVING SYSTEM

(71) Applicants: Hyundai Motor Company, Seoul (KR); Kia Corporation, Seoul (KR)

(72) Inventors: Gyeong Cheol Kim, Hwaseong-si (KR); Jong Hyun Kim, Suwon-si (KR); Sang Jin Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/828,442

(22) Filed: May 31, 2022

(65) Prior Publication Data
US 2022/0416711 A1    Dec. 29, 2022

(30) Foreign Application Priority Data
Jun. 29, 2021 (KR) .......................... 10-2021-0085070

(51) Int. Cl.
*H02P 23/00* (2016.01)
*H02P 25/00* (2006.01)
*H02P 27/00* (2006.01)
*H02P 27/08* (2006.01)
*H02P 25/18* (2006.01)
(Continued)

(52) U.S. Cl.
CPC ............ *H02P 27/08* (2013.01); *H02M 7/537* (2013.01); *H02P 25/18* (2013.01); *H02P 25/22* (2013.01)

(58) Field of Classification Search
CPC .......... H02P 27/08; H02P 25/18; H02P 25/22; H02M 7/537
USPC ....................................................... 318/811
See application file for complete search history.

(56) References Cited

U.S. PATENT DOCUMENTS 11,050,379 B1 *  6/2021 Floreancig .............. H02M 5/04
2009/0033253 A1    2/2009 Nagashima et al.
(Continued)

FOREIGN PATENT DOCUMENTS

JP            6285256 B2    2/2018
KR    10-2021-0027673 A    3/2021
(Continued)

*Primary Examiner* — Erick D Glass
(74) *Attorney, Agent, or Firm* — Morgan, Lewis & Bockius LLP (57) ABSTRACT

A motor driving system includes first and second motors including multiple first windings and second windings; a first inverter including a DC terminal connected to a DC voltage source and an AC terminal connected to the multiple first windings; a first switch part including a plurality of first mode change switches connected to the multiple first windings; a second inverter including a DC terminal connected to the DC voltage source and an AC terminal connected to the plurality of first mode change switches; a second switch part including a plurality of second mode change switches connected to the AC terminal of the second inverter and the multiple second windings; a third switch part including a plurality of third mode change switches connected to the multiple first windings; and a controller configured to control the short-circuited state or the open state of the multiple first mode, second and third mode change switches, based on whether the first and the second motors are driven.

20 Claims, 3 Drawing Sheets (51) Int. Cl.
*H02M 7/537* (2006.01)
*H02P 25/22* (2006.01)

(56) References Cited

U.S. PATENT DOCUMENTS

| 2019/0229670 | A1* | 7/2019 | Arisawa | H02P 27/08 |
| 2020/0059189 | A1* | 2/2020 | Ohashi | H02P 27/06 |

FOREIGN PATENT DOCUMENTS

| KR | 10-2021-0122343 A | 10/2021 |
| KR | 10-2022-0031308 A | 3/2022 |

* cited by examiner

MOTOR DRIVING SYSTEM

CROSS REFERENCE TO RELATED APPLICATION

The present application claims priority to Korean Patent Application No. 10-2021-0085070, filed Jun. 29, 2021, the entire contents of which is incorporated herein for all purposes by this reference.

BACKGROUND OF THE INVENTION

Field of the Invention

The present disclosure relates to a motor driving device, and more particularly, to a motor driving system capable of driving two or more motors in various types according to the required motor output.

Description of Related Art

In general, wirings of respective phases included in a motor have first ends connected to an inverter and second ends connected to each other, thereby forming Y-connection.

When the motor is driven, switching elements inside the inverter are turned on/off by pulse-width modulation control, and apply a line voltage to the Y-connected motor wirings to generate an AC current, thereby generating torque.

The fuel efficiency (or electric efficiency) of an environment-friendly vehicle (for example, an electric car) using torque generated by such a motor as power is determined by the inverter-motor power conversion efficiency, and maximizing the inverter power conversion efficiency and the motor efficiency is crucial to fuel efficiency improvement.

The efficiency of the inverter-motor system is largely determined by the inverter's voltage use ratio. The vehicle's fuel efficiency may be improved when a vehicle driving point determined by the relation between the motor speed and torque is formed in an interval with a high voltage use ratio.

However, when the number of motor windings is increased to increase the maximum motor torque, the interval with a high voltage usage ratio becomes far from a low-torque area (vehicle's major driving point), thereby degrading the fuel efficiency. When a major driving point is included in the interval with a high voltage usage ratio in view of fuel efficiency, the maximum motor torque may be limited, thereby degrading the vehicle acceleration performance.

To solve such problems, an open-end winding (OEW) type motor driving technique has been proposed in the pertinent technical field such that, instead of short-circuiting first ends of motor wirings through Y-connection, two inverters are connected to both ends of motor wirings, respectively, and are driven accordingly.

Such an OEW-type motor driving technique is advantageous in that, compared with conventionally driving a motor having a Y-connection structure, the phase voltage is increased, thereby improving the voltage use ratio and enabling high output.

However, the OEW-type motor driving technique has a problem in that, because two inverters are used to drive a single motor, the power that the single motor can output is limited, and the same is not appropriate for driving conditions requiring larger power.

The above descriptions regarding background technologies have been made only to help understanding of the background of the present disclosure, and are not to be deemed by those skilled in the art to correspond to already-known related arts.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving system capable of driving two or more motors in various types according to the required motor output such that, for example, a single motor is driven in a Y-connection type and an open-end winding type, or each motor is driven in the Y-connection type.

In accordance with an aspect, the present disclosure provides a motor driving system including: a first motor including multiple first windings corresponding to multiple phases, respectively; a second motor including multiple second windings corresponding to multiple phases, respectively, first ends of the multiple second windings being connected to each other; a first inverter including a DC terminal connected to a DC voltage source, and an AC terminal connected to respective first ends of the multiple first windings; a first switch part including a plurality of first mode change switches including first ends connected to second ends of the multiple first windings, respectively; a second inverter including a DC terminal connected to the DC voltage source and an AC terminal connected to respective second ends of the plurality of first mode change switches; a second switch part including a plurality of second mode change switches including opposite ends connected to the AC terminal of the second inverter and respective second ends of the multiple second windings; a third switch part including a plurality of third mode change switches including first ends connected to second ends of the multiple first windings, respectively, and including second ends connected to each other; and a controller configured to control the short-circuited state or the open state of the plurality of first mode change switches, the plurality of second mode change switches, and the plurality of third mode change switches, according to a request for driving the first motor and the second motor.

In an exemplary embodiment of the present disclosure, in a mode in which the first motor is driven and the second motor is not driven, the controller is configured to adjust the plurality of first mode change switches to the short-circuited state, may adjust the plurality of second mode change switches and the plurality of third mode change switches to the open state, and may adjust the first inverter and the second inverter connected to the opposite ends of the first windings, respectively, to drive the first motor in an open-end winding type.

In an exemplary embodiment of the present disclosure, in a mode in which the first motor is driven and the second motor is not driven, the controller is configured to adjust the plurality of third mode change switches to the short-circuited state to establish a Y-connection at the second ends of the multiple first windings, and may adjust the first inverter to drive the first motor.

In an exemplary embodiment of the present disclosure, the controller is configured to adjust the plurality of first mode change switches to the open state, may adjust the plurality of second mode change switches to the open state, or may adjust switching elements in the second inverter to the open state.

In an exemplary embodiment of the present disclosure, in a mode in which the first motor and the second motor are driven simultaneously, the controller is configured to adjust the plurality of third mode change switches to the short-circuited state to establish a Y-connection at the second ends of the multiple first windings, and may adjust the first inverter to drive the first motor, and may adjust the plurality of first mode change switches to the open state, may adjust the plurality of second mode change switches to the short-circuited state, and may adjust the second inverter to drive the second motor.

In an exemplary embodiment of the present disclosure, the controller is configured to receive an input for a required output and may determine a mode for driving the first motor and the second motor based on a result of a comparison between the input required output and a predetermined first reference value, a second reference value greater than the first reference value, and a third reference value greater than the second reference value.

In an exemplary embodiment of the present disclosure, when the required output is smaller than or equal to the predetermined first reference value, the controller is configured to adjust the plurality of third mode change switches to the short-circuited state to establish a Y-connection at the second ends of the multiple first windings, and may adjust the first inverter to drive the first motor.

In an exemplary embodiment of the present disclosure, the controller is configured to adjust the plurality of first mode change switches to the open state, may adjust the plurality of second mode change switches to the open state, or may adjust switching elements in the second inverter to the open state.

In an exemplary embodiment of the present disclosure, when the required output is greater than the first reference value and smaller than or equal to the second reference value, the controller is configured to adjust the plurality of first mode change switches to the short-circuited state, may adjust the plurality of second mode change switches and the plurality of third mode change switches to the open state, and may adjust the first inverter and the second inverter connected to opposite ends of the first windings, respectively, to drive the first motor in an open end winding type.

In an exemplary embodiment of the present disclosure, when the required output is greater than the second reference value, the controller is configured to adjust the plurality of third mode change switches to the short-circuited state to establish a Y-connection at the second ends of the multiple first windings, and may adjust the first inverter to drive the first motor, and may adjust the plurality of first mode change switches to the open state, may adjust the plurality of second mode change switches to the short-circuited state, and may adjust the second inverter to drive the second motor.

According to the above-mentioned motor driving system, when a larger output is required in an open-end winding-type motor driving system, some of inverters applied to the open-end winding type may be applied to drive an additional motor without adding a separate inverter so that the desired output may be secured simply by adding a motor without adding an inverter, thereby suppressing as much as possible an increase in the manufacturing cost involved in output increase.

Furthermore, a motor driving system according to various embodiments of the present disclosure may drive motors in a type optimized for the required output magnitude, for example, in various options such as single motor Y-connection driving, single motor OEW driving, and multiple motor driving, thereby improving the overall system efficiency.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a motor driving system according to various embodiments of the present disclosure will be described in detail with reference to the accompanying drawings.

Figure 1:
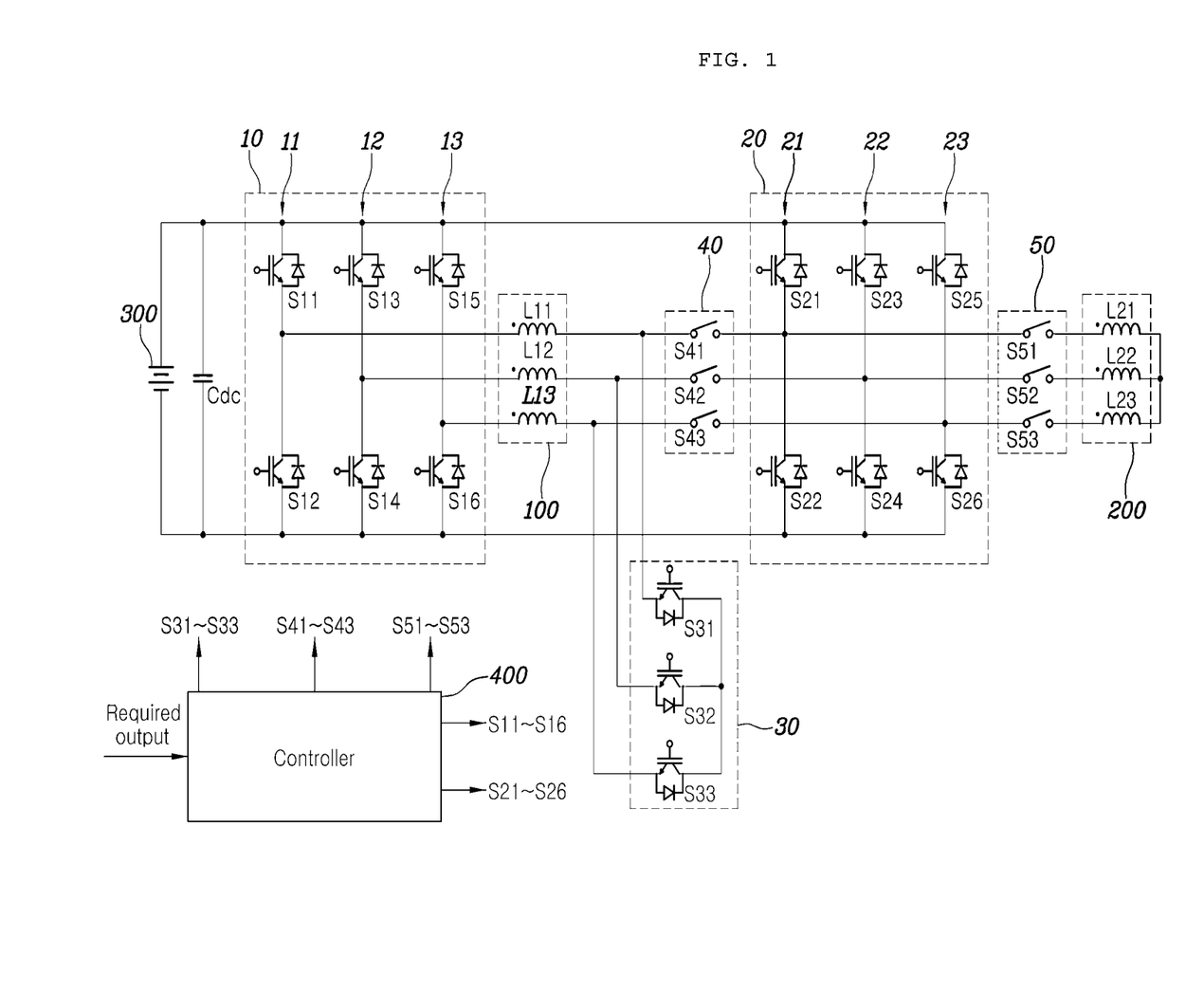
FIG. 1 is a circuit diagram illustrating a motor driving system according to an exemplary embodiment of the present disclosure.

FIG. 1 is a circuit diagram illustrating a motor driving system according to an exemplary embodiment of the present disclosure.

Referring to FIG. 1, a motor driving system according to an exemplary embodiment of the present disclosure may include: a first motor 100 including multiple first windings L11-L13 corresponding to multiple phases; a second motor 200 including multiple second windings L21-L23 corresponding to multiple phases; a first inverter 10 including a direct current (DC) terminal connected to a DC voltage source 300 and an alternative current (AC) terminal connected to respective first ends of the multiple first windings L11-L13; a first switch part 40 including a plurality of first mode change switches S41-S43 including first ends connected to second ends of the multiple first windings L11-L13, respectively; a second inverter 20 including a DC terminal connected to the DC voltage source 300 and an AC terminal connected to respective second ends of the plurality of first mode change switches S41-S43; a second switch part 50 including a plurality of second mode change switches S51-S53, opposite ends of the second mode change switches S51-S53 being connected to the AC terminal of the second inverter 20 and second ends of the multiple second windings L21-L23, respectively; a third switch part 30 including a plurality of third mode change switches S31-S33 including first ends connected to second ends of the multiple first windings L11-L13, respectively, and second ends connected to each other; and a controller 400 for controlling a short-circuited/open state of the plurality of first mode change switches S41-S43, the plurality of second mode change switches S51-S53, and the plurality of third mode change switches S31-S33 according to a request for driving the first motor 100 and the second motor 200.

The first motor 100 and the second motor 200 may include the multiple first windings L11-L13 and the multiple second windings L21-L23, respectively, which each are provided with phase voltage and phase current to form a magnetic field.

The multiple first windings L11-L13 included in the first motor 100 may include one ends connected to the first inverter 10 and the other ends selectively connectable to the second inverter 20 or to each other.

The multiple second windings L21-L23 included in the second motor 200 may include one ends selectively connectable to the second inverter 20 and the other ends connected to each other.

The first inverter 10 and the second inverter 20 may convert DC power stored in a battery 300 into three-phase AC power to provide the same to the first motor 100 or the second motor 200, or upon regenerative braking, may convert regenerative braking energy generated by occurrence of regenerative braking torque of the first motor 100 or the second motor 200 into DC to provide the same to the battery 300. Such conversion between DC power and AC power may be performed by pulse width modulation controlling of multiple first switching elements S11-S16 included in the first inverter 10 and multiple second switching elements S21-S26 included in the second inverter 20.

A terminal portion through which the first inverter 10 and the second inverter 20 are connected to the battery 300 may be called a DC terminal of each inverter, and a terminal portion through which the first inverter 10 and the second inverter 20 are connected to the first motor 100 or the second motor 200 may be called an AC terminal of each inverter.

The first inverter 10 may include multiple legs 11-13 to which a DC voltage generated in a DC link capacitor Cdc connected between opposite ends of the battery 300 is applied. The legs 11-13 may respectively correspond to multiple phases of the first motor 100 and establish an electrical connection therebetween.

A first leg 11 of the first inverter 10 may include two switching elements S11 and S12 connected to each other in series between opposite ends of the DC capacitor Cdc to which a voltage of the battery 300 is applied, and a connection node of the two switching elements S11 and S12 may be connected to one end of a winding L11 of one phase in the first motor 100 to allow AC power corresponding to one phase among multiple phases to be input or output therethrough.

Similarly, a second leg 12 of the first inverter 10 may include two switching elements S13 and S14 connected to each other in series between opposite ends of the DC capacitor Cdc, and a connection node of the two switching elements S13 and S14 may be connected to one end of the winding L12 of one phase in the first motor 100 to allow AC power corresponding to one phase among multiple phases to be input or output therethrough.

Furthermore, a third leg 13 of the first inverter 10 may include two switching elements S15 and S16 connected to each other in series between opposite ends of the DC capacitor Cdc, and a connection node of the two switching elements S15 and S16 may be connected to one end of the winding L13 of one phase in the first motor 100 to allow AC power corresponding to one phase among multiple phases to be input or output therethrough.

The second inverter 20 may have a similar composition to that of the first inverter 10. The second inverter 20 may include multiple legs 21-23 to which a DC voltage generated in a DC link capacitor Cdc connected between opposite ends of the battery 300 is applied. Each of the legs 21-23 may correspond to multiple phases of the first motor 100 and the second motor 200, and may be selectively and electrically connected to the first motor 100 or the second motor 200.

A first leg 21 of the second inverter 20 may include two switching elements S21 and S22 connected to each other in series between opposite ends of the DC capacitor Cdc, and a connection node of the two switching elements S21 and S22 may be selectively connectable to the other end of the winding L11 of one phase in the first motor 100 or to winding L21 of one phase in the second motor 200 to allow AC power corresponding to one phase among multiple phases to be input or output therethrough.

Similarly, a second leg 22 of the second inverter 20 may include two switching elements S23 and S24 connected to each other in series between opposite ends of the DC capacitor Cdc, and a connection node of the two switching elements S23 and S24 may be selectively connectable to the other end of the winding L12 of one phase in the first motor 100 or to winding L22 of one phase in the second motor 200 to allow AC power corresponding to one phase among multiple phases to be input or output therethrough.

Furthermore, a third leg 23 of the second inverter 20 may include two switching elements S25 and S26 connected to each other in series between opposite ends of the DC capacitor Cdc, and a connection node of the two switching elements S25 and S26 may be selectively connectable to the other end of the winding L13 of one phase in the first motor 100 or to a winding L23 of one phase in the second motor 200 to allow AC power corresponding to one phase among multiple phases to be input or output therethrough.

The first switch part 40 may include a plurality of first mode change switches S41-S43 for determining a state of respective electrical connections between each of the other ends of the multiple windings L11-L13 in the first inverter 10 and the AC terminal of the second inverter 20, that is, each connection node of each pair of switching elements included in the multiple legs 21-23 in the second inverter 20.

The short-circuited/open state of the plurality of first mode change switches S41-S43 in the first switch part 40 may be adjusted by the controller 400 based on the operation mode of the system.

The second switch part 50 may include a plurality of second mode change switches S51-S53 for determining a state of respective electrical connections between the one ends of the multiple windings L21-L23 in the second motor 200 and the AC terminal of the second inverter 20, that is, each connection node of each pair of switching elements included in each of the legs 21-23 in the second inverter 20.

The short-circuited or open state of the plurality of second mode change switches S51-S53 in the second switch part 50 may be adjusted by the controller 400 based on the operation mode of the system, as well.

The third switch part 30 may include a plurality of third mode change switches S31-S33 including one ends connected to the other ends of the multiple windings L11-L13 included in the first motor 100, respectively, and the other ends connected to each other.

The short-circuited or open state of the plurality of third mode change switches S31-S33 in the third switch part 30 may be adjusted by the controller 400 based on the operation mode of the system, as well.

Basically, the controller 400 is a component which determines whether to drive the first motor 100 and the second motor 200, and a driving mode for a driving method thereof, based on a required output required for a system (e.g., vehicle) including the first motor 100 and the second motor 200, and according to the determined driving mode, switches an open/short-circuited state of the first to third mode change switches S41-S43, S51-S53, and S31-S33, and the switching elements S11-S16 and S21-S26 included in the first inverter 10 and the second inverter 20 by a pulse width modulation method.

For example, the controller 400 may determine, based on the required output, a first driving mode in which the first motor 100 is driven but not the second motor 200 by using only the first inverter 10, a second driving mode in which the first motor 100 is driven by using the first inverter 10 and the second inverter 20, and a third driving mode in which both the first inverter 10 and the second inverter 20 are driven.

The controller 400 may determine a driving mode based on the comparison of the input required output with a predetermined first reference value and a second reference value greater than the first reference value, and perform a motor driving according to the corresponding driving mode.

The controller 400 may drive a motor in the first driving mode when the required output is smaller than or equal to the predetermined first reference value.

In the first driving mode, the controller 400 may adjust the plurality of third mode change switches S31-S33 to be a short-circuited state.

Through the controlling of the controller 400 above, a Y-connection structure, corresponding a neutral point of a motor, is established by electrically connecting the other ends of the windings L11-L13 of the first motor 100 to each other, and the controller 400 may drive the first motor 100 by switching the switching elements S11-S16 in the first inverter 10 through a conventional pulse width modulation control for driving a motor including a general Y-connection structure.

The first driving mode is a driving mode in which only the first motor 100 is driven when a relatively smallest required output is input, and therefore, the second inverter 20 and the second motor 200 are not driven in the first driving mode. Accordingly, the controller 400 inhibits unnecessary occurrence of a leakage current by controlling, to be the open states, both the plurality of first mode change switches S41-S43 for establishing an electrical connection state between the first motor 100 and the second inverter 20 and the plurality of second mode change switches S51-S53 for establishing an electrical connection state between the second inverter 20 and the second motor 200.

Furthermore, in the first driving mode, the controller 400 may inhibit the occurrence of a leakage current by opening all the switching elements S21-S26 in the second inverter 20, as well.

The controller 400 may drive a motor in the second driving mode when the required output is greater than the predetermined first reference value and smaller than or equal to the second reference value.

In the second driving mode, the controller 400 may adjust all the plurality of second mode change switches S51-S53 and the plurality of third mode change switches S31-S33 to be the open state, and adjust the plurality of first mode change switches S41-S43 to be the short-circuited state.

Through the controlling of the controller 400 above, the other ends of the multiple windings L11-L13 in the first motor 100 may be electrically connected to each of the legs 21-23 of the second inverter 20 to establish an open end winding (OEW) type connection structure in which the opposite ends of the plurality windings L11-L13 of the first motor 100 are connected to the inverters, respectively.

The controller 400 may drive the first motor 100 by switching the switching elements S11-S16 in the first inverter 10 and the switching elements S21-S26 in the second inverter 20 through a conventional pulse width modulation controlling for driving an OEW type motor.

Generally, it is known that the driving an OEW type motor utilizes larger voltage compared to the driving an ordinary Y-connection structure motor, and thus larger power may be obtained from the motor. Accordingly, when a power greater than the first reference value and smaller than or equal to the second reference value is required during the driving the first motor 100 in the first driving mode, the required output may be achieved by changing the Y-connection structure of the first motor 100 to be the open end winding structure through adjusting the mode change switches S31-S33, S41-S43, and S51-S53 and controlling the same.

The controller 400 may drive a motor in the third driving mode when the required output is greater than the predetermined second reference value.

In the third driving mode, the controller 400 may adjust all the plurality of second mode change switches S51-S53 and the plurality of third mode change switches S31-S33 to be a short-circuited state, and adjust the plurality of first mode change switches S41-S43 to be an open state.

Through the controlling of the controller 400 above, the other ends of the multiple windings L11-L13 in the first motor 100 may be electrically connected to each other and the legs 21-23 of the second inverter 20 may be electrically connected to the windings L21-L23 of the second motor 200, respectively. Therefore, the other ends of the windings L11-L13 of the first motor 100 are electrically connected to each other to establish a Y-connection structure, corresponding a neutral point of a motor, and the second motor 200 is also connected to the second inverter 20 to allow the driving of the Y-connection structure.

The controller 400 may separately drive the first motor 100 and the second motor 200 by respectively switching the switching elements S11-S16 in the first inverter 10 and the switching elements S21-S26 in the second inverter 20 through a conventional pulse width modulation controlling for driving a motor including windings of a general Y-connection structure.

In the instant case, the first motor 100 may be a motor used for a city traveling such as a driving on a paved road, and the second motor 200 may be a motor used for harsh traveling conditions such as a rough road, a frozen road, and the like requiring additional driving power. For example, the first motor 100 may be a motor which is connected to a main driving wheel of a four-wheeled vehicle to be always driven when the vehicle is traveling, and the second motor 200 may be a motor which is connected to an auxiliary driving wheel of the four-wheeled vehicle to be selectively driven when larger driving power is required.

Accordingly, when a power greater than the second reference value is required while driving the first motor 100 in the first driving mode, the controller 400 can immediately change a state of the second motor 200 to be configured for driving through adjusting the mode change switches S31-S33 and S41-S43 and thereby the required output may be achieved promptly in response to the travel environment.

In the description above, the method for controlling the pulse width modulation of the inverter to drive a Y-connection structured motor including a neutral point formed therein and controlling the pulse width modulation of the inverter to drive an open end winding structured motor employs well-known control methods in the art and thus an additional detailed description will be omitted.

Figure 2:
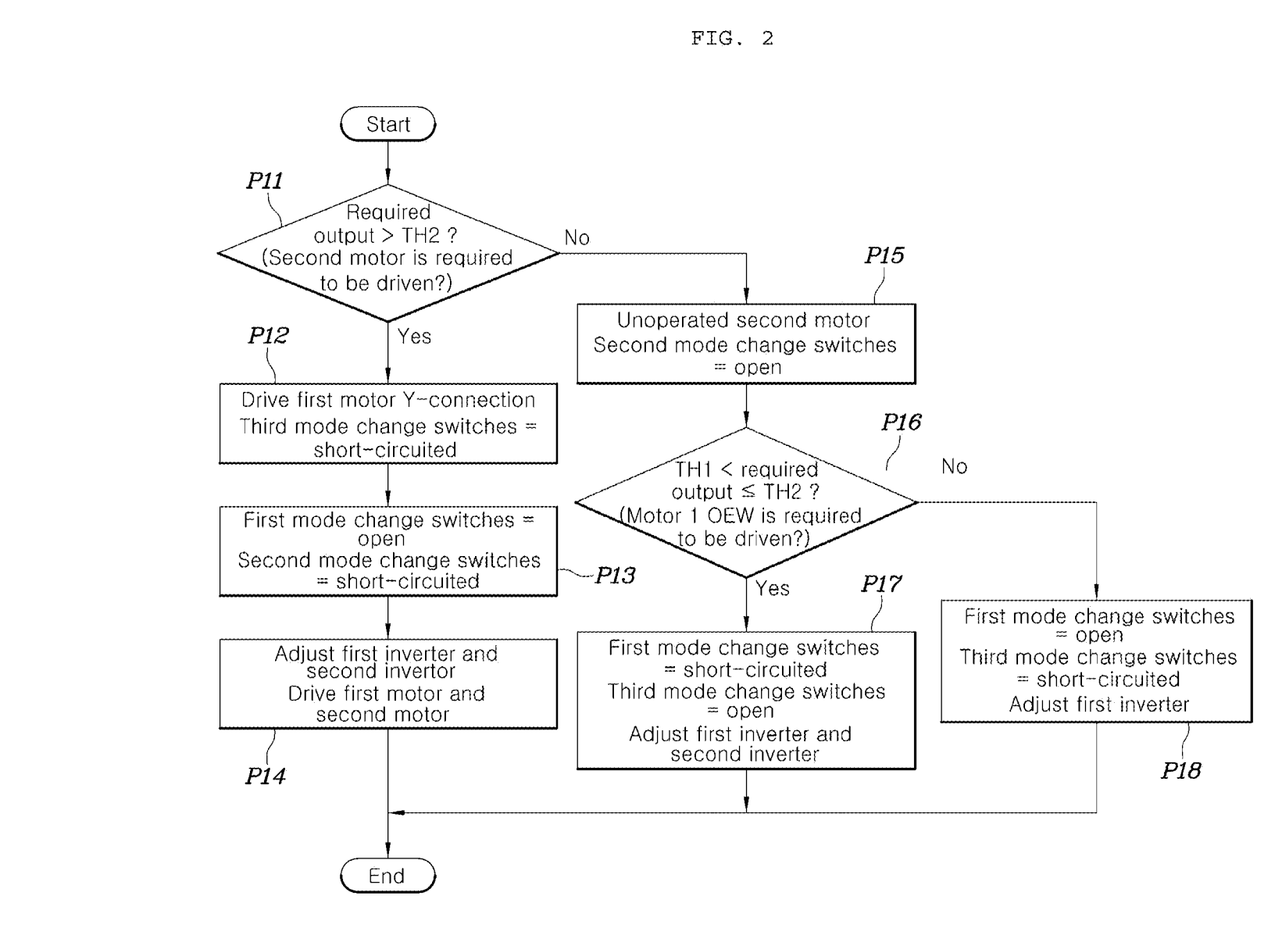
FIG. 2 and FIG. 3 are flowcharts illustrating an operation example of a motor driving system according to an exemplary embodiment of the present disclosure.
Figure 3:
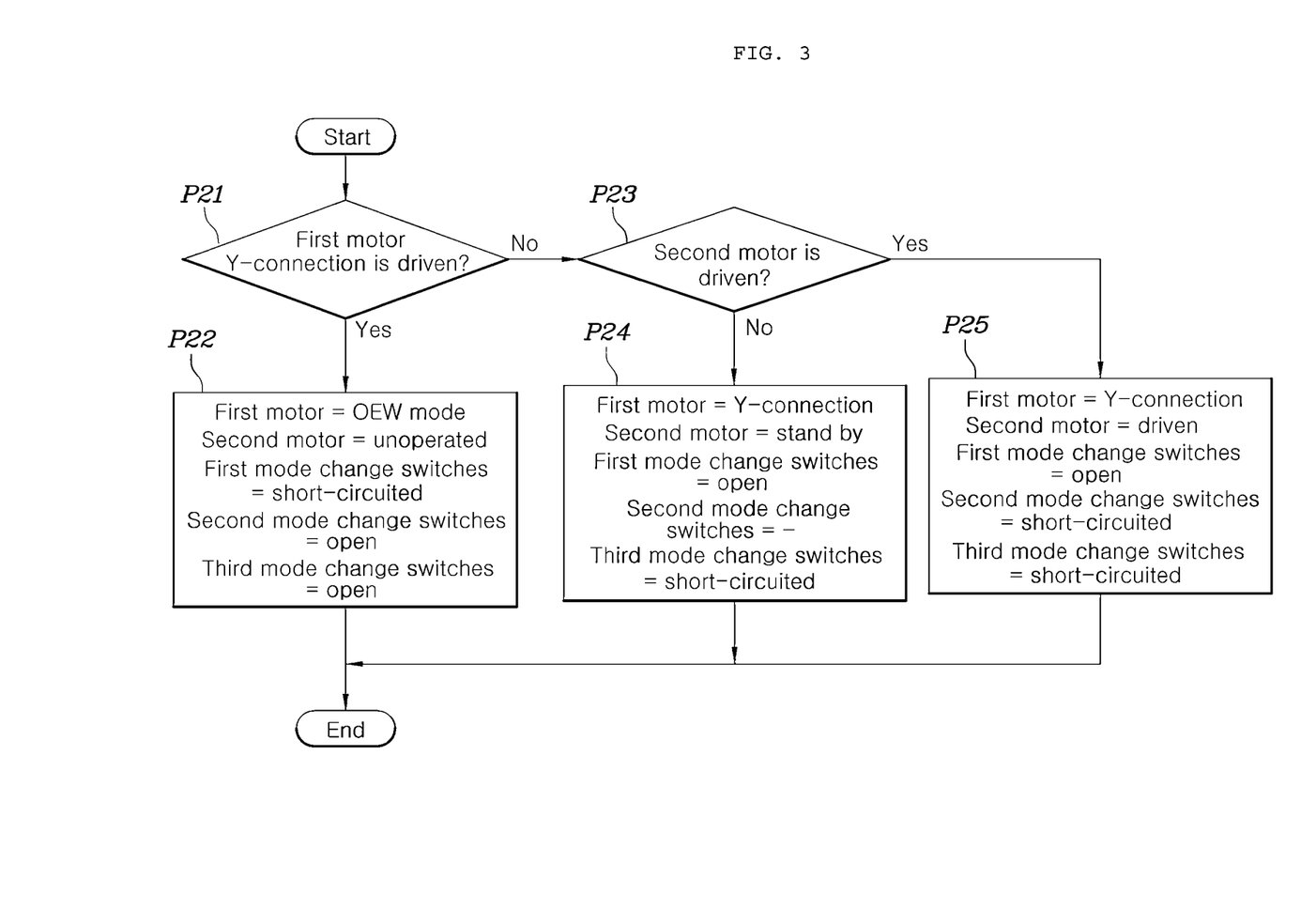

FIG. 2 and FIG. 3 are flowcharts illustrating an operation example of a motor driving system according to an exemplary embodiment of the present disclosure.

Referring to FIG. 2, when the input required output is greater than the predetermined second reference value TH2 (P11), to simultaneously drive the first motor 100 and the second motor 200 in the Y-connection structure, the controller 400 may first allow the plurality of third mode change switches S31-S33 to be short-circuited to establish the Y-connection structure of the first motor 100 (P12).

Furthermore, to separately adjust the first inverter 10 and the second inverter 20, the controller 400 may open the plurality of first mode change switches S41-S43 and allow the plurality of second mode change switches S51-S53 to be short-circuited to electrically connect the second inverter 20 to the second motor 200 (P13).

Thereafter, the controller 400 may control to switch, with the pulse width modulation method, the switching elements S11-S16 in the first inverter 10 and the switching elements S21-S26 in the second inverter 20 to separately drive the first motor 100 and the second motor 200 (P14).

When the input required output is smaller than the predetermined second reference value TH2 (P11) and thus the second motor 200 is not required to be driven, the controller 400 may open the plurality of second mode change switches S51-S53 to electrically insulate the second inverter 20 and the second motor 200 from each other (P15).

When the required output is determined to be greater than the first reference value TH1 through a comparison between the predetermined first reference value TH1 and the required output (P16), to control the first motor 100 with the open end winding method, the controller 400 may allow the plurality of first mode change switches S41-S43 to be short circuited to electrically connect the first motor 100 and the second inverter 20, and open the third mode changes switches S51-S53 to insulate the other ends of the windings L11-L13 in the first motor 100 from each other.

After the adjusting the mode change switches like above, the controller 400 may control to switch, with the pulse width modulation method, the switching elements S11-S16 in the first inverter 10 and the switching elements S21-S26 in the second inverter 20 to drive the first motor 100 with the open end winding method (P17).

When the required output is determined to be smaller than or equal to the first reference value TH1 according to a result of the comparison between the predetermined first reference value TH1 and the required output in operation P16, to drive the first motor 100 in the Y-connection structure, the controller 400 may open the plurality of first mode change switches S41-S43 to electrically insulate the first motor 100 from the second inverter 20, and allow the third mode changes switches S51-S53 to be short circuited to electrically connect the other ends of the windings L11-L13 in the first motor 100 to each other.

After the adjusting the mode change switches like above, the controller 400 may control to switch, with the pulse width modulation method, the switching elements S11-S16 in the first inverter 10 to drive the first motor 100 in the Y-connection structure (P18).

Referring to FIG. 3, the controller 400 may first determine whether to drive the first motor 100 in the Y-connection structure (P21). That is, in operation P21, the controller 400 may determine whether to execute the first driving mode or the third driving mode through a comparison between the required output and the reference values TH1 and TH2.

When the first motor 100 is not required to be driven in the Y-connection structure, the controller 400 may allow the plurality of first mode change switches S41-S43 to be short circuited to electrically connect the first motor 100 and the second inverter 20, open the plurality of second mode change switches to electrically insulate the second inverter 20 from the second motor 200, and open the plurality of third mode change switches S51-S53 to electrically insulate the other ends of the windings L11-L13 in the first motor 100 from each other (P22).

In operation P22, the controller 400 may control to switch, with the pulse width modulation method, the switching elements S11-S16 in the first inverter 10 and the switching elements S21-S26 in the second inverter 20 to drive the first motor 100 with the open end winding method.

In operation P21, when a Y-connection driving of the first motor 100 is determined to be required, the controller 400 may then determine whether a driving of the second motor 200 is required (P23).

When the second motor 200 is not required to be driven, the controller 400 may open the plurality of first mode change switches S41-S43 to electrically insulate the first motor 100 from the second inverter 20, and allow the plurality of third mode change switches S51-S53 to be short circuited to electrically connect the other ends of the windings L11-L13 in the first motor 100 to each other (P24). In the instant case, the short-circuited/open state of the plurality of second mode change switches S51-S53 does not significantly matter, but is preferably to be open for inhibiting occurrence of a leakage current.

In operation P24, the controller 400 may not control to switch the switching elements S21-S26 in the second inverter 20 and may control to switch, with the pulse width modulation method, the switching elements S11-S16 in the first inverter 10 to drive only the first motor 100 in the Y-connection structure.

In operation P23, when the driving of second motor 200 is determined to be required, the controller 400 may open the plurality of first mode change switches S41-S43 to electrically insulate the first motor 100 from the second inverter 20, allow the plurality of second mode change switches S51-S53 to be short circuited to electrically connect the second inverter 20 and the second motor 200, and allow the plurality of third mode change switches S51-S53 to be short circuited to electrically connect the other ends of the windings L11-L13 in the first motor 100 to each other (P25).

In operation P25, after adjusting the mode change switches, the controller 400 may separately control to switch, with the pulse width modulation method, the switching elements S11-S16 in the first inverter 10 and the switching elements S21-S26 in the second inverter 20 to separately drive the first motor 100 and the second motor 200.

As described above, the motor driving system according to various embodiments of the present disclosure may apply a part of the inverters having been applied for the open end winding method for the driving an additional motor without adding separate inverter when a larger power is required in the open end winding type motor driving system, and thereby can achieve desired power by only adding a motor without an additional inverter.

In this regard, the motor driving system according to various embodiments of the present disclosure may maximally suppress the manufacturing cost increasing accompanying with the power increasing.

Furthermore, the motor driving system according to various embodiments of the present disclosure may drive a motor with various methods such as a single motor Y-connection driving method, a single motor open end winding (OEW) driving method, and a multiple motor driving method, to optimally meet a desired power level, and thereby enhance the overall efficiency of the system.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving system comprising:
a first motor including multiple first windings corresponding to multiple phases, respectively;
a second motor including multiple second windings corresponding to multiple phases, respectively, first ends of the multiple second windings being connected to each other;
a first inverter including a DC terminal connected to a DC voltage source, and an AC terminal connected to respective first ends of the multiple first windings;
a first switch part including a plurality of first mode change switches including first ends connected to second ends of the multiple first windings, respectively;
a second inverter including a DC terminal connected to the DC voltage source and an AC terminal connected to respective second ends of the plurality of first mode change switches;
a second switch part including a plurality of second mode change switches including opposite ends connected to the AC terminal of the second inverter and respective second ends of the multiple second windings;
a third switch part including a plurality of third mode change switches including first ends connected to second ends of the multiple first windings, respectively, and including second ends connected to each other; and
a controller connected to the first inverter, the second inverter, the first switch part, the second switch part and the third switch part and configured to control a short-circuited state or an open state of the plurality of first mode change switches, the plurality of second mode change switches, and the plurality of third mode change switches, according to a request for driving the first motor and the second motor.

2. The motor driving system of claim 1, wherein in a mode in which the first motor is driven and the second motor is not driven, the controller is configured to adjust the plurality of first mode change switches to the short-circuited state, to adjust the plurality of second mode change switches and the plurality of third mode change switches to the open state, and to adjust the first inverter and the second inverter connected to the opposite ends of the first windings, respectively, to drive the first motor in an open-end winding type.

3. The motor driving system of claim 1, wherein in a mode in which the first motor is driven and the second motor is not driven, the controller is configured to adjust the plurality of third mode change switches to the short-circuited state to establish a Y-connection at the second ends of the multiple first windings, and to adjust the first inverter to drive the first motor.

4. The motor driving system of claim 3, wherein the controller is configured to adjust the plurality of first mode change switches to the open state, to adjust the plurality of second mode change switches to the open state, or to adjust switching elements in the second inverter to the open state.

5. The motor driving system of claim 1, wherein in a mode in which the first motor and the second motor are driven simultaneously, the controller is configured to adjust the plurality of third mode change switches to the short-circuited state to establish a Y-connection at the second ends of the multiple first windings, and to adjust the first inverter to drive the first motor, and to adjust the plurality of first mode change switches to the open state, to adjust the plurality of second mode change switches to the short-circuited state, and to adjust the second inverter to drive the second motor.

6. The motor driving system of claim 1, wherein the controller is configured to receive an input for a required output and to determine a mode for driving the first motor and the second motor based on a result of a comparison between the input required output and a predetermined first reference value, a second reference value greater than the first reference value, and a third reference value greater than the second reference value.

7. The motor driving system of claim 6, wherein when the required output is smaller than or equal to the predetermined first reference value, the controller is configured to adjust the plurality of third mode change switches to the short-circuited state to establish a Y-connection at the second ends of the multiple first windings, and to adjust the first inverter to drive the first motor.

8. The motor driving system of claim 7, wherein the controller is configured to adjust the plurality of first mode change switches to the open state, to adjust the plurality of second mode change switches to the open state, or to adjust switching elements in the second inverter to the open state.

9. The motor driving system of claim 6, wherein when the required output is greater than the first reference value and smaller than or equal to the second reference value, the controller is configured to adjust the plurality of first mode change switches to the short-circuited state, to adjust the plurality of second mode change switches and the plurality of third mode change switches to the open state, and to adjust the first inverter and the second inverter connected to opposite ends of the first windings, respectively, to drive the first motor in an open end winding type.

10. The motor driving system of claim 6, wherein when the required output is greater than the second reference value, the controller is configured to adjust the plurality of third mode change switches to the short-circuited state to establish a Y-connection at the second ends of the multiple first windings, and to adjust the first inverter to drive the first motor, and to adjust the plurality of first mode change switches to the open state, to adjust the plurality of second mode change switches to the short-circuited state, and to adjust the second inverter to drive the second motor.

11. A method of controlling a motor driving system including a first motor including multiple first windings corresponding to multiple phases, respectively; a second motor including multiple second windings corresponding to multiple phases, respectively, first ends of the multiple second windings being connected to each other; a first inverter including a DC terminal connected to a DC voltage source, and an AC terminal connected to respective first ends of the multiple first windings; a first switch part including a plurality of first mode change switches including first ends connected to second ends of the multiple first windings, respectively; a second inverter including a DC terminal connected to the DC voltage source and an AC terminal connected to respective second ends of the plurality of first mode change switches; a second switch part including a plurality of second mode change switches including opposite ends connected to the AC terminal of the second inverter and respective second ends of the multiple second windings; a third switch part including a plurality of third mode change switches including first ends connected to second ends of the multiple first windings, respectively, and including second ends connected to each other, the method comprising:
  controlling, by a controller connected to the first inverter, the second inverter, the first switch part, the second switch part and the third switch part, the short-circuited state or the open state of the plurality of first mode change switches, the plurality of second mode change switches, and the plurality of third mode change switches, according to a request for driving the first motor and the second motor.

12. The method of claim 11, wherein in a mode in which the first motor is driven and the second motor is not driven, the controller is configured to adjust the plurality of first mode change switches to the short-circuited state, to adjust the plurality of second mode change switches and the plurality of third mode change switches to the open state, and to adjust the first inverter and the second inverter connected to the opposite ends of the first windings, respectively, to drive the first motor in an open-end winding type.

13. The method of claim 11, wherein in a mode in which the first motor is driven and the second motor is not driven, the controller is configured to adjust the plurality of third mode change switches to the short-circuited state to establish a Y-connection at the second ends of the multiple first windings, and to adjust the first inverter to drive the first motor.

14. The method of claim 13, wherein the controller is configured to adjust the plurality of first mode change switches to the open state, to adjust the plurality of second mode change switches to the open state, or to adjust switching elements in the second inverter to the open state.

15. The method of claim 11, wherein in a mode in which the first motor and the second motor are driven simultaneously, the controller is configured to adjust the plurality of third mode change switches to the short-circuited state to establish a Y-connection at the second ends of the multiple first windings, and to adjust the first inverter to drive the first motor, and to adjust the plurality of first mode change switches to the open state, to adjust the plurality of second mode change switches to the short-circuited state, and to adjust the second inverter to drive the second motor.

16. The method of claim 11, wherein the controller is configured to receive an input for a required output and to determine a mode for driving the first motor and the second motor based on a result of a comparison between the input required output and a predetermined first reference value, a second reference value greater than the first reference value, and a third reference value greater than the second reference value.

17. The method of claim 16, wherein when the required output is smaller than or equal to the predetermined first reference value, the controller is configured to adjust the plurality of third mode change switches to the short-circuited state to establish a Y-connection at the second ends of the multiple first windings, and to adjust the first inverter to drive the first motor.

18. The method of claim 17, wherein the controller is configured to adjust the plurality of first mode change switches to the open state, to adjust the plurality of second mode change switches to the open state, or to adjust switching elements in the second inverter to the open state.

19. The method of claim 16, wherein when the required output is greater than the first reference value and smaller than or equal to the second reference value, the controller is configured to adjust the plurality of first mode change switches to the short-circuited state, to adjust the plurality of second mode change switches and the plurality of third mode change switches to the open state, and to adjust the first inverter and the second inverter connected to opposite ends of the first windings, respectively, to drive the first motor in an open end winding type.

20. The method of claim 16, wherein when the required output is greater than the second reference value, the controller is configured to adjust the plurality of third mode change switches to the short-circuited state to establish a Y-connection at the second ends of the multiple first windings, and to adjust the first inverter to drive the first motor, and adjusts the plurality of first mode change switches to the open state, to adjust the plurality of second mode change switches to the short-circuited state, and to adjust the second inverter to drive the second motor.

* * * * *